United States Patent [19]
Retzlaff

[11] Patent Number: 5,438,250
[45] Date of Patent: Aug. 1, 1995

[54] PROCESS AND APPARATUS FOR CHARGING A MULTI-CELL BATTERY

[75] Inventor: Werner Retzlaff, Friedberg, Germany

[73] Assignee: Mentzer Electronic GmbH, Bad Nauheim, Germany

[21] Appl. No.: 124,244

[22] Filed: Sep. 20, 1993

[30] Foreign Application Priority Data

Sep. 22, 1992 [DE] Germany ............ 42 31 732.0

[51] Int. Cl.[6] ............................................. H02L 7/04
[52] U.S. Cl. ................................. 320/17; 320/44
[58] Field of Search .................. 320/15, 16, 17, 18, 320/31, 32, 43, 44

[56] References Cited

U.S. PATENT DOCUMENTS

| | | | |
|---|---|---|---|
| 3,493,837 | 2/1970 | Sparks et al. | |
| 3,505,584 | 4/1970 | Ford et al. | 320/17 |
| 3,623,139 | 11/1971 | Dickerson | 320/17 X |
| 3,740,636 | 6/1973 | Hogrefe et al. | 320/44 X |
| 4,079,303 | 3/1978 | Cox | 320/17 |
| 4,331,911 | 5/1982 | Park | 320/14 |
| 4,387,332 | 6/1983 | Oyamada et al. | 320/15 |
| 4,467,266 | 8/1984 | Ritchie | 320/43 X |
| 4,484,140 | 11/1984 | Dieu | 324/434 |
| 4,616,170 | 10/1986 | Urstoger | 320/18 X |
| 5,387,857 | 2/1995 | Honda et al. | 320/18 |

FOREIGN PATENT DOCUMENTS 2216277A of 0000 United Kingdom.

Primary Examiner—Kristine L. Kincaid
Attorney, Agent, or Firm—Richard S. Roberts

[57] ABSTRACT

A process for charging a multi-cell battery by the use of a battery recharging device and a device controlled by a microcontroller and containing a potential-free battery recharging device to analyze and optimize the charged state of a multi-cell battery, with a device for the switchable connection of selectable terminal voltages of battery sections or cells by means of a voltage measuring device. The microcontroller generates a charge current control signal for the battery recharging device which is calculated from the control algorithm of the microcontroller such that the voltage of the cell with the respectively highest terminal voltage is brought to and maintained at the level of a desired voltage value. Preferably the voltage threshold value is associated with the respective point in time of a characteristic charge curve recommended as being optimal for the type of cell used. Preferably, cells having a low charge state compared to their charge capacity, as determined by the voltage measuring device and microcontroller, are recharged individually and sequentially with a potential free recharging device during or after a main charging of the composite battery with the battery charger.

13 Claims, 3 Drawing Sheets

PROCESS AND APPARATUS FOR CHARGING A MULTI-CELL BATTERY

BACKGROUND OF THE INVENTION

The present invention relates to a process for charging a multicell battery by means of a battery recharging device and a device, controlled by a microcontroller, which contains a potential-free recharging device to analyze the charge state of such a battery having a plurality of cells or battery sections.

In the course of charging and discharging series-connected batteries, the terminal voltages of the individual cells or battery sections are different because of unavoidable different structural chemical and electrical parameters of the individual cells. For this reason, when using conventional chargers which, only utilize the terminal voltages of a large number of series-connected cells for controlling the charging process in accordance with known characteristic charging curves (UI-, W-, etc.), an unnoticed, increasingly varying charge of the cells occurs over time. This can go so far that the polarity of individual cells is changed. Hermetically sealed cells cause a particular problem in this case because they require the maintenance of a maximum charging voltage for preserving the electrolyte. This is further described in EP 0 339 446. In addition, when a multi-cell battery fails, it is difficult and time consuming to find the defective battery cell. Also, a determination of the reason for the failure is fundamentally impossible. Another problem occurs when individual cells are replaced by fresh ones having parameters which can widely vary in comparison to the remaining cells. This effect is particularly known to occur in Pb gel cells, the initial capacity of which is only about 70% of the final value, and which attain this final capacity only after 20 to 50 cycles. These cells cannot be satisfactorily charged by means of conventional chargers, so that the manufacturer is forced to make so-called pre-cycled cells or battery sections available.

The invention concerns two problems, namely the measuring, diagnosis or analysis of batteries, in particular the determination of the instantaneous capacity, and the directed recharging of selected cells or battery sections. A number of processes are known which infer the charge state of a composite battery from the terminal quality of the entire battery. These are described in EP 0 067 589, EP 0 071 816 and EP 0 090 699. Another arrangement is described in EP 0 112 242 which refers to the measurement of the capacity of a battery composed of series-connected individual elements. In this prior arrangement, the entire battery is loaded by means of a bleeder. Then all elements are cyclically addressed by means of a sequencer and the terminal voltages of all elements are sequentially supplied to a comparator. In addition, the discharging time is monitored. When the terminal voltage of an element falls below a threshold value, the cyclic measuring process is interrupted. The reference potential for the measurement of each cell voltage is the ground potential, so that with an increase in the number of elements the accuracy of this method is greatly reduced. Furthermore, a quantitative statement of the capacity is impossible and only the threshold value is monitored. Recharging of individual cells during the charging of the composite battery is not possible with this arrangement. In the circuit described in EP 0 277 321, the wiring outlay in connection with the measurement of a plurality of individual elements is reduced in that each cell or group of cells is connected with a measuring circuit which is triggered via a common control line and/or measuring line. These values are sequentially provided via a common measurement line to a common evaluation device. The battery charging system described in EP 0 074 444 shows a microprocessor and one or more sensors for detecting and further processing electrical signals in order to obtain output signals therefrom, which can be used for controlling the charging and for display. The computer controlled installation in accordance with EP 0 314 155 is used for charging a plurality of batteries, which may be of different types and are not electrically connected in series. The type and initial load of each battery is first determined and then the batteries are charged in the inverse order of their initial charge. The systems disclosed in EP 0 067 590, EP 0 121,325, EP 0 012 315, EP 0 181 112, EP 0 293 664 and EP 0 336 381 partially represent very expensive solutions, but are all based on the terminal voltage of the composite battery. A charging process is disclosed in EP 0 361 859 which permits charging and measuring of a plurality of batteries with the aid of a microprocessor. An automatically controlled microprocessor battery testing device BAT-CAT is available commercially from the firm ANPICO. This device is used exclusively for battery diagnoses. The cell voltages are read in via a plurality of analog inputs (measuring plugs) with high resolution (12 bit). Another battery charging and control system (BL+CS) is available commercially from Hildebrand Industrie Electronic in Dietlikon, Switzerland. With this device the individual cells or battery sections are connected via bipolar relays with a processor-controlled measuring and charging device, wherein one relay per cell is provided.

It is an object of the invention to provide a process for charging a multi-cell battery of the above mentioned type, by means of which overcharging of individual cells of the battery can be assuredly prevented, so that the battery as a whole is protected and its service life extended.

SUMMARY OF THE INVENTION

The invention provides a system for charging a multi-cell battery which comprises:
- a.) a battery with a plurality of series connected cells;
- b.) a plurality of two-wire line pairs;
- c.) a first selection network comprising a plurality of switching relays, each of said relays being connected to one of said battery cells and to one of said two wire line pairs;
- d.) each of said two-wire line pairs being connected to a monitoring network, the output of which monitoring network is connected with an analog input of a microcontroller, and which output indicates the highest voltage on said two-wire line pairs;
- e.) each of said two-wire line pairs being further connected with a second selection network capable of switching the two-wire line pairs to a battery recharging device; another output of said second selection network being further connected to a filter assembly having at least one RC filter;
- f.) at least one of said RC filters being connected to a third selection network which is in turn connected to the input of a voltage measuring device; an output of which voltage measuring device is applied to an analog input of the microcontroller; which microcontroller generates a charge current control signal for the battery recharging device;

g.) a current detection device connected to a negative pole of the battery and a ground input terminal of a current measuring device; said current measuring device having two inverted operational amplifiers, the negative supply of which is connected to ground or a negative terminal of the battery, and two inputs of which are connected to the current detection device, the outputs of each of said amplifiers being connected to an analog input of the microcontroller.

The invention also comprises a process for charging a multi-cell battery by the use of a battery recharging device and a device controlled by a microcontroller and containing a potential-free battery recharging device to analyze the charged state of a composite battery having a plurality of cells or battery sections, having switching arrangements for connecting at least one battery section to at least one two-wire line connected to a diagnostic circuit. A system of a plurality of two-wire lines corresponding to a fraction of the total number of battery cells or battery sections in the composite battery is provided, wherein multipole relays with a number of switching contacts corresponding to the number of two-wire lines are provided as switching arrangements. Each one is connected to a line of its associated two-wire line, wherein the switching contacts of all multipole relays are connected on the one side with the junction of the battery cells or battery sections and on the other with the two-wire lines. In the series connection of the battery cells or battery sections, adjoining junctions are alternately connected with different lines of a two-wire line, wherein each two-wire line is connected or can be connected to an RC filter consisting of at least one resistor and one capacitor. The capacitor can be switched via a bipolar switching member to the input of a voltage measuring device, after the junctions, associated with the battery cell or battery section to be measured and connected with the RC filter via two of the multipole relays, have been disconnected from the RC filter. In the process, an output of the voltage measuring device is applied to an analog input of the microcontroller; which microcontroller generates a charge current control signal for the battery recharging device; which is calculated from a control algorithm of the microcontroller in such a way that the voltage of the cell with the highest terminal voltage is brought to and maintained at the level of an optimal voltage value. In the preferred embodiment, cells with a lower terminal voltage are recharged individually or sequentially in accordance with their charge capacity as determined by the voltage measuring device during or after charging of the battery with the aid of the potential-free battery recharging device, which can be switchably connected with one of the two-wire lines in the second selection network.

DETAILED DESCRIPTION OF THE PREFERRED EMBODIMENT

Figure 1:
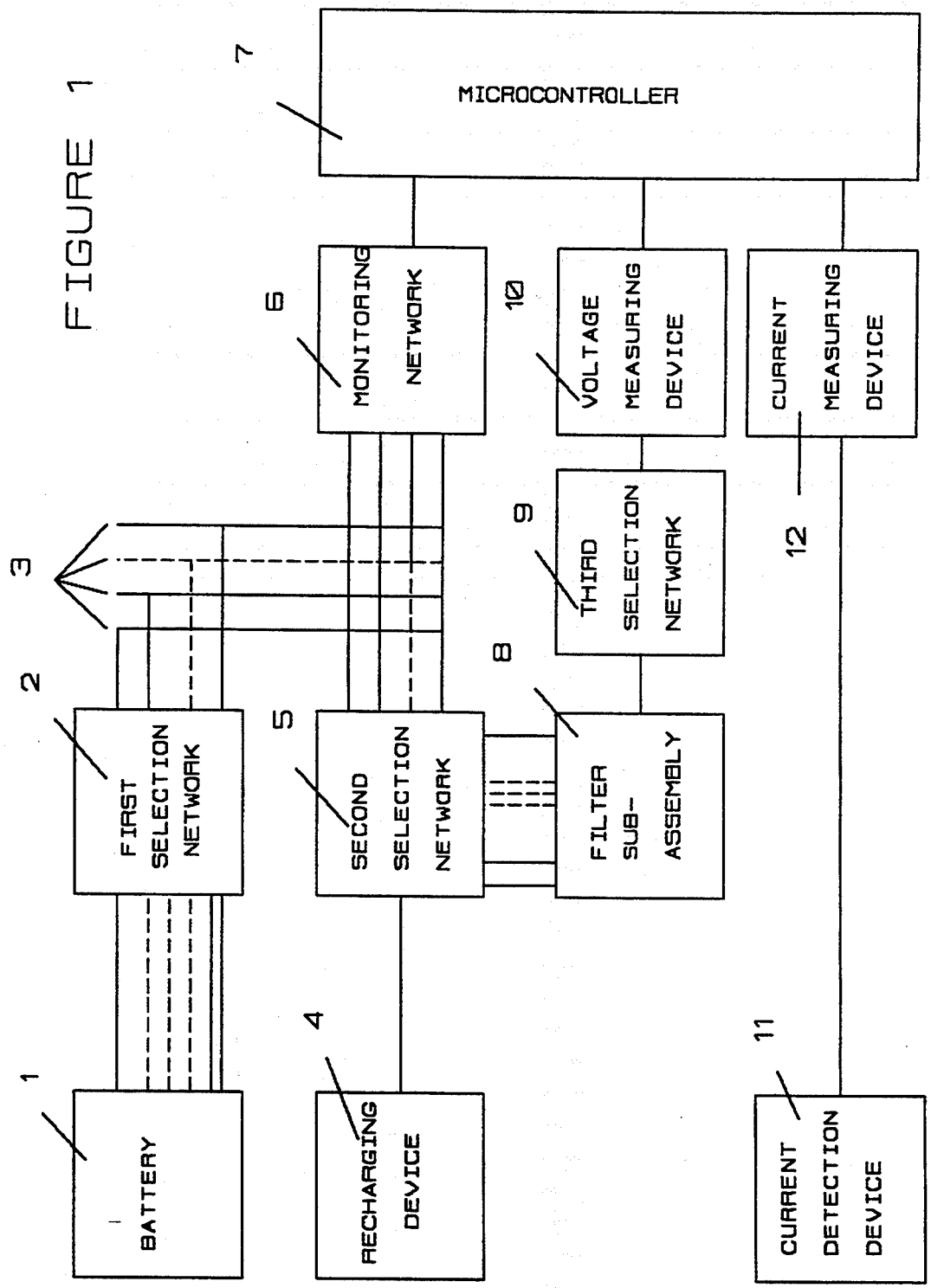
FIG. 1 schematically shows the structure of the circuitry of a device in accordance with the invention.

FIG. 1 shows a microcontroller 7 with binary inputs-/outputs and analog inputs, and a first selection network 2 by means of which all junctions of the series-connected individual cells or battery sections of a battery 1 can be switchably connected with a system 3 of two-wire lines. Each line of the system 3 of two-wire lines is respectively connected with one input of a monitoring network 6, the output of which is connected with an analog input of the microcontroller 7. The system 3 of two-wire lines is furthermore connected with a second selection network 5, in which one of the two-wire lines 3 can be switchably connected with a potential-free battery recharging device 4, and in which the system of two-wire lines can be connected with at least two output lines which are connected with the inputs of a filter subassembly 8 having at least one RC filter. One of the RC filters can be interconnected in a third selection network 9 with the input of a voltage measuring device 10, the output of which is connected with an analog input of the microcontroller 7.

The charging and discharging and possibly the recuperation currents are provided to a current detection device 11, containing one measuring shunt respectively for the charge current and the discharge/recuperation currents and to a current measuring device 12, the outputs of which are connected with the analog inputs of the microcontroller. The measuring shunts are respectively connected by means of one terminal with the negative pole of the battery 1 and a common measuring input (ground terminal) of the measuring device 12. For measuring the discharge/recuperation current, the current measuring device 12 contains inverted operation amplifiers the negative supply voltage of which is connected with the ground terminal of the measuring inputs or the negative terminal of the battery 1 and the two inputs of which are d.c.-connected with the current detection device 11. The outputs of both amplifiers are connected respectively with an analog input of the microcontroller.

Figure 2:
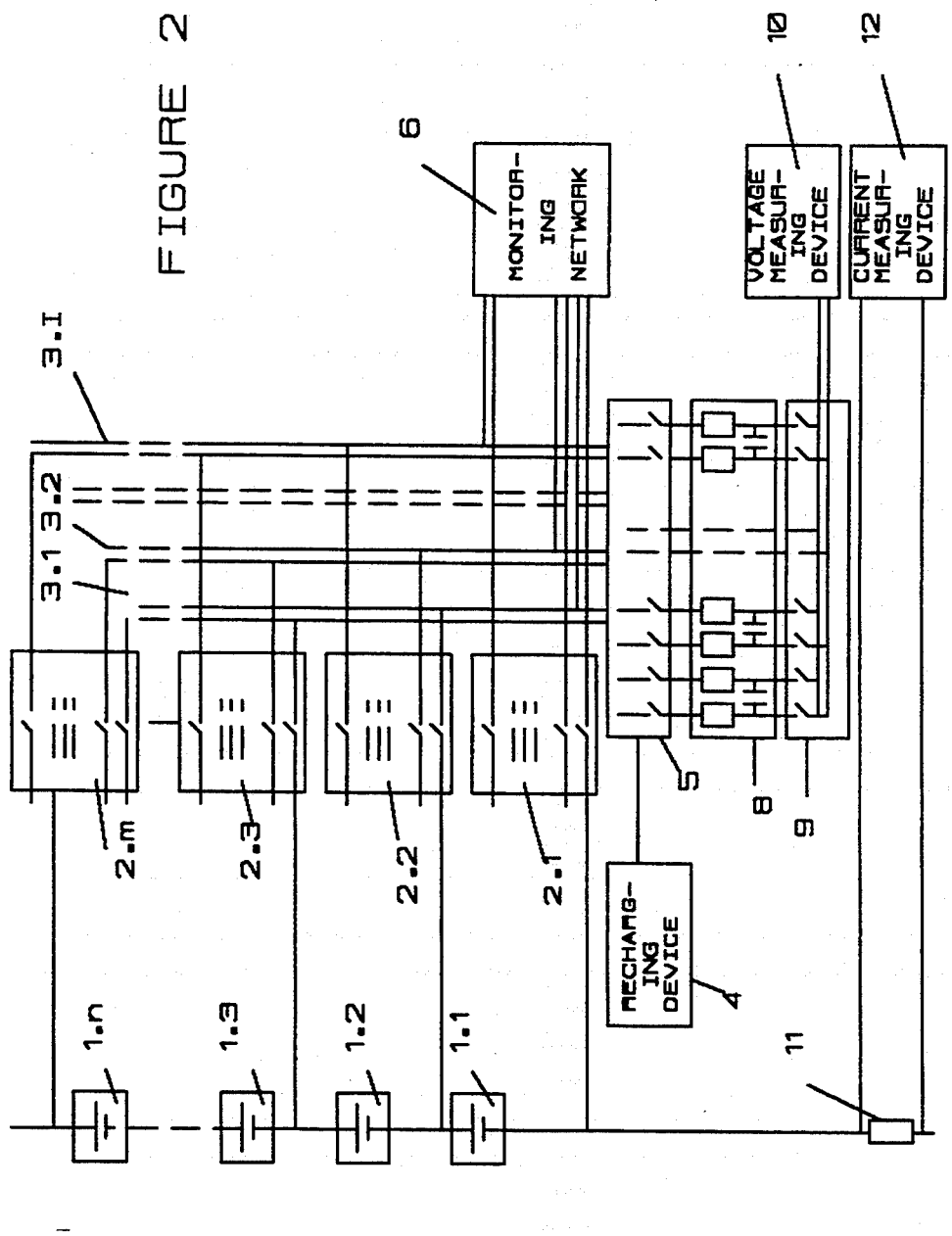
FIG. 2 provides a more detailed view of the interconnection of the individual components of the circuit in accordance with FIG. 1.

A more precise explanation of the way the individual components are connected with each other is provided by means of FIG. 2. The $n$ cells or battery sections 1.1 to 1.$n$ to be measured or recharged are switchably connected, with the aid of a first selection network 2, consisting of m multipole relays 2.1 to 2.$m$, which are identical and have an even number I of operating contacts, in such a way with a system of two-wire lines 3.I to 3.L agreeing in its number with the number of the contacts of the relays 2.1...2.$m$. Respectively one two-wire line 3 is assigned to an area of successive cells or battery sections, wherein successive battery junctions can be alternately interconnected by means of their relays 2.1...2.$m$, which follow each other by the numbers of their order, with respectively one of the two lines of the respective two-wire lines associated to the respective battery area.

The potentials of all two-wire lines 3 are compressed into a state-of-line signal in a monitoring network 6, consisting of a diode network with a common cathode and a voltage divider, with the aid of which the microcontroller can recognize and process the highest potential within all lines of the two-wire lines 3. In the second selection network 5 it is possible to switchably connect respectively one of the two-wire lines 3 with a potential-free energy source for recharging in such a way, that the correct pole of the cell or battery section 1.x actuated with the aid of two adjoining relays 2.1...2.m is connected with the battery recharging device 4. Energy supply for the battery recharging device 4 can be provided from an external source or preferably from the battery 1 with the aid of a DC-DC converter with potential separation.

The second selection network 5 is, in addition, connected with at least one and at most with a number of RC members 8 corresponding to the number of two-wire lines 3, so that respectively at least one capacitor can be interconnected with at least one two-wire line selected from the second selection network 5. Respectively one of the capacitors is selected in a third selection network 9 and is supplied to a voltage measuring device 10 embodied for processing input voltages of either polarity, in which a capacitor voltage selected in the third selection network 9 is processed for measuring by the microcomputer. When employing the described arrangement, the number of relays required in the first selection network is merely n DIV K+1, where n is the number of cells or battery sections and K the number of contacts of the relays 2.1 ... 2.m. In addition, the same relays 2.1 ... 2.m are used for measurement as well as recharging.

Figure 3:
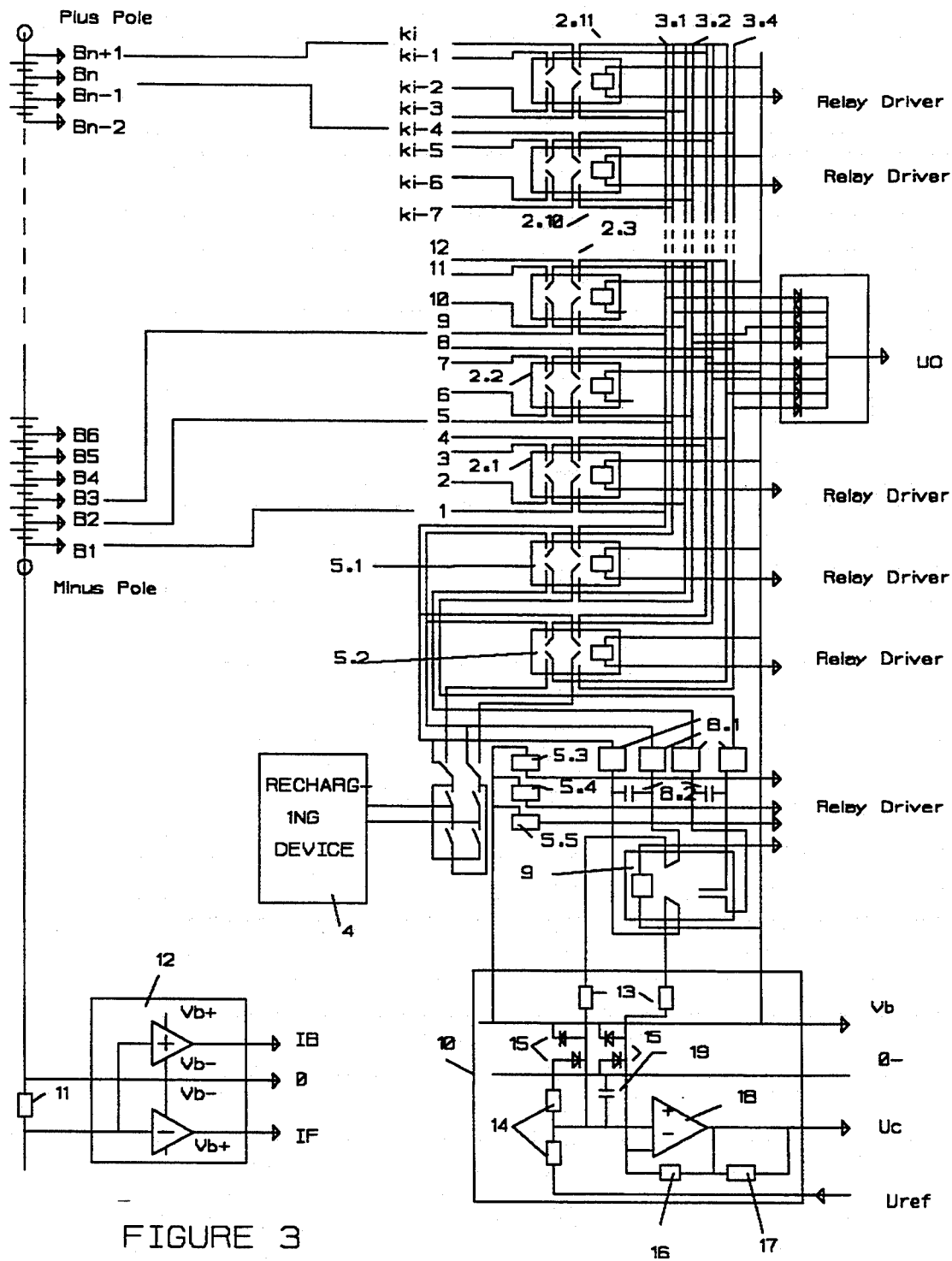
FIG. 3 shows a particularly exemplary embodiment of the device for performing the process of the invention.

The circuit arrangement of a particular exemplary embodiment, used for the analyses and recharging of a maximum of 40 cells or battery sections, is illustrated in FIG. 3. If k input terminals of the first selection network 2 consisting of relays, with respectively four operating contacts, are consecutively numbered in the manner illustrated, and if n represents the number of actually existing cells or battery sections, the order of connections between the i-th negative pole terminal of a cell or battery section and the j-th input terminal of the first selection network 2 is represented by the equation $$i = 1 + (((j-1)MOD\ 4) \times d) + ((j-1)DIV\ 4) \quad (1)$$

$$\text{wherein } d = (n+3)DIV\ 4 \quad (2)$$

DIV represents integer division without remainder. MOD is the modulo operator. The minimum number of relays needed is d+1. The battery terminal index i=n+1 is associated with the negative terminal of the n+first cell or battery section, which is not present, and identifies the positive terminal of the n-th cell or battery section.

The second selection network consists of two quadripole relays 5.1 and 5.2, which are switched in such a way that two of the four two-wire lines 3.1 to 3.4 can be selected. The relays 5.3 to 5.5 permit the correct polarity connection of the battery recharging device 4 to one of the two-wire lines selected by means of the relays 5.1 or 5.2.

For each of these two two-wire lines, the filter subassembly 8 contains an RC filter with resistors 8.1 which are identical and the capacitors 8.2. The third selection network 9 merely consists of a relay with two alternating contacts. The voltage measuring device 10 contains two identical voltage limiting resistors 13, four limiting diodes 15 with a small leakage current, two balance resistors 14, a filter capacitor 19, an operational amplifier 18, a feed-back resistor 16 and a ground resistor 17. One of the series-connected balance resistors 14 is connected with a reference voltage Uref, required for the operation of an analog to digital converter (ADC), not shown here in detail, and the output voltage Uc is connected with an analog input of the microcontroller 7.

The total operation of the device can be divided into the following components in accordance with the above mentioned purposes. Cyclically continuous analysis of the charged state of the individual cells or battery sections; recharging of individual cells or battery sections as required; protection and monitoring functions along with current measurement; and operation and display/output of selectable analysis results.

Two basic operations are of particular interest for the present invention, namely, measuring the terminal voltage of the selected cell or battery section and recharging a selected cell. A requirement for both operations is the described device for the selection of a cell or battery section.

Measuring a Partial Voltage

First, all relays are inactive. Then, the third selection network 9 is triggered by the microcontroller in such a way that the capacitor 8.2, which is of no interest for the subsequent voltage measurement, is connected with the input of the voltage measuring device 10. Afterwards, two adjoining relays 2.i, 2.(i 1) and one of the relays 5.1 to 5.2 are triggered by the microcontroller in such a way that the capacitor 8.2, which is not connected with the input of the voltage measuring device 10, is connected with the cell or battery section to be measured. This relevant measuring capacitor is charged without bias to the value of the terminal voltage to be measured via the current-limiting resistors 8.1, because it is not connected via the input resistors 13 to the input of the voltage measuring device 10.

Thus, in the course of the subsequent—technically not really synchronous with time opening of the contacts of the relays 5.1 or 5.2 for even a short time, no error current via the resistors 13 and corresponding to a possible relatively high in-phase voltage can lead to a charge displacement in the relevant measuring capacitor 8.2.

Following the opening of the contacts of the relay 5.1 or 5.2 controlled by the microcontroller, the third selection network 9 is switched, so that the relevant measuring capacitor is connected with the input of the voltage measuring device 10. An output voltage corresponding to the voltage of the cell or battery section is available at the output Uc for reading-in by the microcontroller at the expiration of a transition time determined by an overload of the operational amplifier, caused immediately prior to this by the time constant R14/2-C19, and the slew rate of the operational amplifier 18 and possibly as a result of a high in-phase voltage at the resistors 13.

Recharging of a Cell or Battery Section

First all relays are inactive. Then, by means of the relays 2.1...2.m, 5.1 or 5.2 and the relays 5.3, a current path is provided in such a way that the alternating contacts of the relay 5.3 are connected with the cell or battery section to be recharged. Up to this time all relays switch in the currentless state. Then, corresponding to the polarity, the relay 5.4 or 5.5 is switched in, by means of which the output of the battery recharging device 4 is connected with the addressed cell or battery section. In case the current or voltage source of the battery recharging device 4 cannot be enabled by the microcontroller, the relay 5.4 or 5.5 turns the charge current on. If the battery recharging device is electronically enabled, the relay 5.4 or 5.5 is always switched to no-load. Turning the charge current off is performed in the reverse sequence, so that in every case only the relay 5.4 or 5.5 is switched to load.

The microcontroller 7 generates a charge current control signal for the battery recharging device 4. This charge current control signal is calculated from the control algorithm of the microcontroller 7 in such a way that the voltage of the cell with the respectively highest terminal voltage is brought to and maintained at the level of a desired voltage value, preferably the voltage threshold value associated with the respective point in time of a characteristic charge curve recommended by the manufacturer of the battery as being optimal for the type of cell used.

Protection and Monitoring

To assure that, there will be no accident and particularly no short circuits, in the course of the relatively complicated operation and with the multiplicity of the relay contacts used, the process in accordance with the invention is such that all lines of the two-wire lines 3 are compressed in a monitoring network 6 into an analog value which can be read by the microcontroller. The reference potential of the microcontroller (ground potential for analog measuring) for this measurement is the negative pole of the battery. Each one of the two-wire lines is connected with respectively one anode of a highly blocking diode, the cathodes of which are switched in parallel and connected with the input of a voltage divider, at the output of which it is possible by means of the microcontroller to read in the line state information provided in the form of an analog value UO. The respectively highest positive potential on the two-wire lines 3 can be detected by means of this arrangement. The monitoring subassembly can also consist of a resistor network, wherein a line state signal with a higher information content is available when precision resistors are used.

It is therefore possible for the microcontroller, prior to each connection of an arbitrary relay of the first switching network 2, to perform a check of whether the voltage levels on the lines correspond to the expectations, so that in case of deviations it is possible to output information regarding the suspected defect relay.

Current Measurement

If discharge or recuperation current flows through the current detection device 11, a voltage in respect to the negative pole of the battery or the neutral terminal of the current measuring device 12 which is polarized depending on the direction of the current is generated at its terminal connected with the measuring input. Because of this, respectively one of the operational amplifiers connected with the shunt is either overloaded or provides a voltage proportional to the current at its output. Since both amplifier outputs IB and IF are connected to the microcontroller 7, it is possible for the latter to determine in which direction current flows and what its strength is.

With the process of the invention, first the terminal voltages of all battery cells are measured and the battery cell with the highest terminal voltage is determined. Then the composite battery is charged, on the basis of the charge current recommended by the battery manufacturer as being optimal for an individual cell, with this charge current for the cell with the highest terminal voltage. It is assured by means of this that no battery cell is disadvantageously overcharged. Because in this charging process the other battery cells might not be fully charged, these battery cells can be recharged individually during or after the main charging process with the aid of the recharging device 4, while leaving the battery cell with the highest terminal voltage out.

Preferably, cells with a lower terminal voltage are recharged individually or sequentially and in accordance with their charge capacity determined by the voltage measuring device 10 during or after charging of the composite battery with the aid of the potential-free battery recharging device 4, which can be switchably connected with respectively one of the two-wire lines with the aid of the second selection network 5.

What is claimed is:

1. A process for charging a multi-cell battery having a plurality of series connected battery cells, by the use of a battery recharger and a device controlled by a microcontroller and containing a potential-free battery recharger to analyze and optimize the charged state of the battery, the device having switching arrangements for connecting one or more of the battery cells one each to one of a plurality of two-wire line pairs, said two-wire pairs are connected to a diagnostic circuit, wherein multipole relays with a number of switching contacts corresponding to the number of said two-wire line pairs are provided as switching arrangements, each relay being connected to one of the two-wire line pairs, wherein the switching contacts of the relays are connected on one side with a junction of the battery cells and on another side with one of the two-wire line pairs that in the series connection of the battery cells, adjacent junctions are alternately connected with different lines of one of the two-wire line pairs wherein each of the two-wire line pairs can be connected to an RC filter having at least one resistor and one capacitor, the capacitor of which can be switched via a bipolar switching member to an input of a voltage measuring device, after junctions of one of the battery cells to be measured, which are connected with the RC filter via two of the relays, have been disconnected from the RC filter, the process comprising the microcontroller generating a charge current control signal for the battery recharger which is calculated by the microcontroller in such a way that the voltage of one of the cells with the highest terminal voltage is brought to an maintained at the level of an optimal voltage value.

2. A process in accordance with claim 1, wherein one or more of the battery cells with a low terminal voltage are recharged individually and sequentially and in accordance with their charge capacity determined by the voltage measuring device with the potential-free battery recharger, said battery recharger can be switchably connected with one of the two-wire line pairs by a selection network.

3. In a process for charging a battery comprising a plurality of series connected battery cells by means of a battery recharger and a device for analyzing the charged state of the battery, which device is controlled by a microcontroller, the device having switching arrangements for connecting at least one battery cell of the series of battery cells to at least one of a plurality of two-wire line pairs which is connected to a diagnostic circuit, in which a plurality of the two-wire line pairs corresponding to a fraction of a total number of the battery cells in the battery is provided, wherein multipole relays having a number of switching contacts corresponding to a number of the two-wire line pairs are provided as switching arrangements, each being connected to a line of the two-wire line pairs, wherein switching contacts of the multipole relays are connected on one side with a junction of the battery cells and on the other with the two-wire line pairs, wherein the battery cells having adjacent junctions are alternately connected with different lines of one of the two-wire line pairs and wherein each of the two-wire line pairs is connected to an RC filter having at least one resistor and one capacitor, the capacitor of which can be switched via a bipolar switching member to an input of a voltage measuring device, after junctions, associated with one of the battery cells to be measured and connected with the RC filter via two of the multipole relays, have been disconnected from the RC filter, the process comprises generating a charge current control signal for the battery recharger by the microcontroller which is calculated by the microcontroller in such a way that the voltage of one of the cells with the highest terminal voltage is brought to and maintained at the level of a predetermined optimal voltage value.

4. A process in accordance with claim 3, wherein one or more of the battery cells with a low terminal voltage are recharged individually and sequentially and in accordance with their charge capacity determined by the voltage measuring device during or after charging of the battery with the potential-free battery recharger, which potential-free battery recharger can be switchably connected with one of the two-wire line pairs by a selection network.

5. A process for continuously analyzing the charge state of a battery having a plurality of series connected battery cells and selectively recharging the battery cells which comprises:
   a.) providing a battery having a plurality of series connected cells;
   b.) providing a plurality of two-wire line pairs;
   c.) providing an analysis circuit comprising a first selection network comprising a plurality of switching relays, each of said relays being connected to one of said battery cells and to one of said two wire line pairs; each of said two-wire line pairs being connected to a monitoring network, an output of said monitoring network being connected with an analog input of a microcontroller, and the output indicates the highest voltage on said two-wire line pairs; each of said two-wire line pairs being further connected with a second selection network capable of switching the two-wire line pairs to a battery recharging device; an output of said second selection network being further connected to a filter assembly having at least one RC filter; said at least one RC filter being connected to a third selection network which is in turn connected to an input of a voltage measuring device; an output of said voltage measuring device is applied to an input of the microcontroller; said microcontroller generates a charge current control signal for the battery recharging device; a current detection device connected to a negative pole of the battery and a ground input terminal of a current measuring device; said current measuring device having two inverted operational amplifiers, a negative supply of each of said amplifiers is connected to ground or a negative terminal of the battery, and inputs of each of said amplifiers are connected to the current detection device, outputs of each of said amplifiers being connected to an additional input of the microcontroller;
   d.) analyzing the charge state of said battery cells with the analysis circuit;
   e.) generating the charge current control signal for the battery recharging device by the microcontroller which is calculated from a control algorithm of the microcontroller in such a way that the voltage of one of the cells with the highest terminal voltage is brought to and maintained at the level of a predetermined optimal voltage value.

6. A process in accordance with claim 5, wherein the cells with a lower terminal voltage than said predetermined optimal voltage value are recharged in accordance with their charge capacity as determined by the voltage measuring device.

7. A system for charging a multicell battery which comprises
   a.) a battery with a plurality of series connected cells;
   b.) a plurality of two-wire line pairs;
   c.) a first selection network comprising a plurality of switching relays, each of said relays being connected to one of said battery cells and to one of said two wire line pairs;
   d.) each of said two-wire line pairs being connected to a monitoring network, an output of the monitoring network is connected with an analog input of a microcontroller, wherein the output indicates the highest voltage on said two-wire line pairs;
   e.) each of said two-wire line pairs being further connected with a second selection network capable of switching the two-wire line pairs to a battery recharging device; an output of said second selection network being further connected to a filter assembly having at least one RC filter;
   f.) said at least one RC filter being connected to a third selection network which is in turn connected to an input of a voltage measuring device; an output of the voltage measuring device is applied to a second analog input of the microcontroller, wherein the microcontroller generates a charge current control signal for the battery recharging device;
   g.) a current detection device connected to a negative pole of the battery and a ground input terminal of a current measuring device; said current measuring device having two inverted operational amplifiers, a negative supply of each of said amplifiers is connected to ground or a negative terminal of the battery, and inputs of each of said amplifiers are connected to the current detection device, outputs of each of said amplifiers being connected to a third analog input of the microcontroller.

8. The system of claim 7 wherein the monitoring network comprises a voltage divider and a diode network with a common cathode.

9. The system of claim 7 wherein the second selection network is capable of switching an energy supply from the battery recharging device to one or more of the battery cells by means of one of the two-wire line pairs.

10. The system of claim 7 wherein the second selection network comprises two quadripole relays.

11. The system of claim 7 wherein the battery comprises from 2 to about 40 cells.

12. The system of claim 7 wherein the third selection network comprises a relay with two alternating contacts.

13. The system of claim 7 wherein the voltage measuring device comprises two voltage limiting resistors, four limiting diodes, two balance resistors, a filter capacitor, an operational amplifier, a feed-back resistor and a ground resistor.

* * * * *